United States Patent
Zhang

(10) Patent No.: US 11,143,129 B2
(45) Date of Patent: Oct. 12, 2021

(54) METHOD FOR OPERATING AN INTERNAL COMBUSTION ENGINE

(71) Applicant: Vitesco Technologies GmbH, Hannover (DE)

(72) Inventor: Hong Zhang, Munich (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 16/755,468

(22) PCT Filed: Oct. 8, 2018

(86) PCT No.: PCT/EP2018/077250
§ 371 (c)(1),
(2) Date: Apr. 10, 2020

(87) PCT Pub. No.: WO2019/072730
PCT Pub. Date: Apr. 18, 2019

(65) Prior Publication Data
US 2020/0240345 A1    Jul. 30, 2020

(30) Foreign Application Priority Data

Oct. 13, 2017 (DE) ...................... 10 2017 218 327.6

(51) Int. Cl.
*F02D 41/14* (2006.01)
*F01N 3/02* (2006.01)
*F01N 3/08* (2006.01)

(52) U.S. Cl.
CPC ....... *F02D 41/1441* (2013.01); *F01N 3/0842* (2013.01); *F01N 2550/02* (2013.01);
(Continued)

(58) Field of Classification Search
CPC ............. F02D 41/1441; F02D 41/1454; F02D 41/1463; F02D 41/146; F02D 41/2474;
(Continued)

(56) References Cited

U.S. PATENT DOCUMENTS

| 6,301,878 B1 | 10/2001 | Zhang et al. | 60/274 |
| 7,028,464 B2 | 4/2006 | Rösel et al. | 60/285 |

(Continued)

FOREIGN PATENT DOCUMENTS

| CN | 106988843 A | 7/2017 | ............... F01N 3/08 |
| DE | 19852244 C1 | 12/1999 | |

(Continued)

OTHER PUBLICATIONS

German Office Action, Application No. 102017218327.6, 8 pages, dated Jun. 15, 2018.

(Continued)

*Primary Examiner* — Audrey B. Walter
*Assistant Examiner* — Dapinder Singh
(74) *Attorney, Agent, or Firm* — Slayden Grubert Beard PLLC

(57) ABSTRACT

Various embodiments include a method for operating an internal combustion engine with a three-way catalytic converter with lambda control, comprising: monitoring a $NO_x$ sensor for a lambda value downstream of the converter; setting a threshold value determining a lambda setpoint value upstream of the converter using the difference between the setpoint value of the electrical signal and the measured electrical signal if the signal is below the threshold; if above the threshold value, determining the lambda setpoint value upstream of the converter using the difference between a $NH_3$ setpoint value of the $NO_x$ sensor and the measured $NH_3$ signal of the $NO_x$ sensor; and if the measured $NH_3$ concentration is higher than the $NH_3$ setpoint value, increasing the (Continued)

lambda setpoint value upstream of the converter and, if the measured $NH_3$ concentration is lower than the $NH_3$ setpoint value, reducing the lambda setpoint value upstream of the converter.

7 Claims, 1 Drawing Sheet

(52) U.S. Cl.
 CPC .. *F01N 2560/025* (2013.01); *F01N 2560/026* (2013.01); *F02D 41/1454* (2013.01); *F02D 41/1463* (2013.01); *F02D 2250/36* (2013.01)

(58) Field of Classification Search
 CPC .......... F02D 2041/1468; F01N 3/0842; F01N 3/0814; F01N 2550/02; F01N 2550/36; F01N 2560/02; F01N 2560/026; F01N 2570/14; F01N 2570/16
 USPC .................. 60/274, 277, 286, 295, 299–301
 See application file for complete search history.

(56) References Cited

U.S. PATENT DOCUMENTS

| | | | |
|---|---|---|---|
| 9,303,575 B2 | 4/2016 | Fisher et al. | |
| 2010/0241340 A1 | 9/2010 | Weber et al. | ................. 701/109 |
| 2011/0083424 A1* | 4/2011 | Wang | ..................... F01N 3/208 |
| | | | 60/277 |
| 2012/0174562 A1* | 7/2012 | Itoh | ....................... F01N 3/2066 |
| | | | 60/274 |
| 2013/0138326 A1* | 5/2013 | Andersson | .......... F02D 41/1402 |
| | | | 701/103 |
| 2016/0082390 A1* | 3/2016 | Nakano | ................. F01N 13/008 |
| | | | 700/271 |
| 2018/0128775 A1* | 5/2018 | Nakano | ................. F01N 13/008 |

FOREIGN PATENT DOCUMENTS

| | | |
|---|---|---|
| DE | 10117050 C1 | 9/2002 |
| EP | 2207953 B1 | 7/1916 |
| EP | 2599985 A1 | 6/2013 |
| JP | 2008175173 A | 7/2008 |
| WO | 2019/072730 A1 | 4/1919 |
| WO | 03/008957 A1 | 1/2003 |

OTHER PUBLICATIONS

International Search Report and Written Opinion, Application No. PCT/EP2018/077250, 16 pages, dated Nov. 26, 2018.
Chinese Office Action, Application No. 201880066710.0, 7 pages, dated May 19, 2021.

* cited by examiner

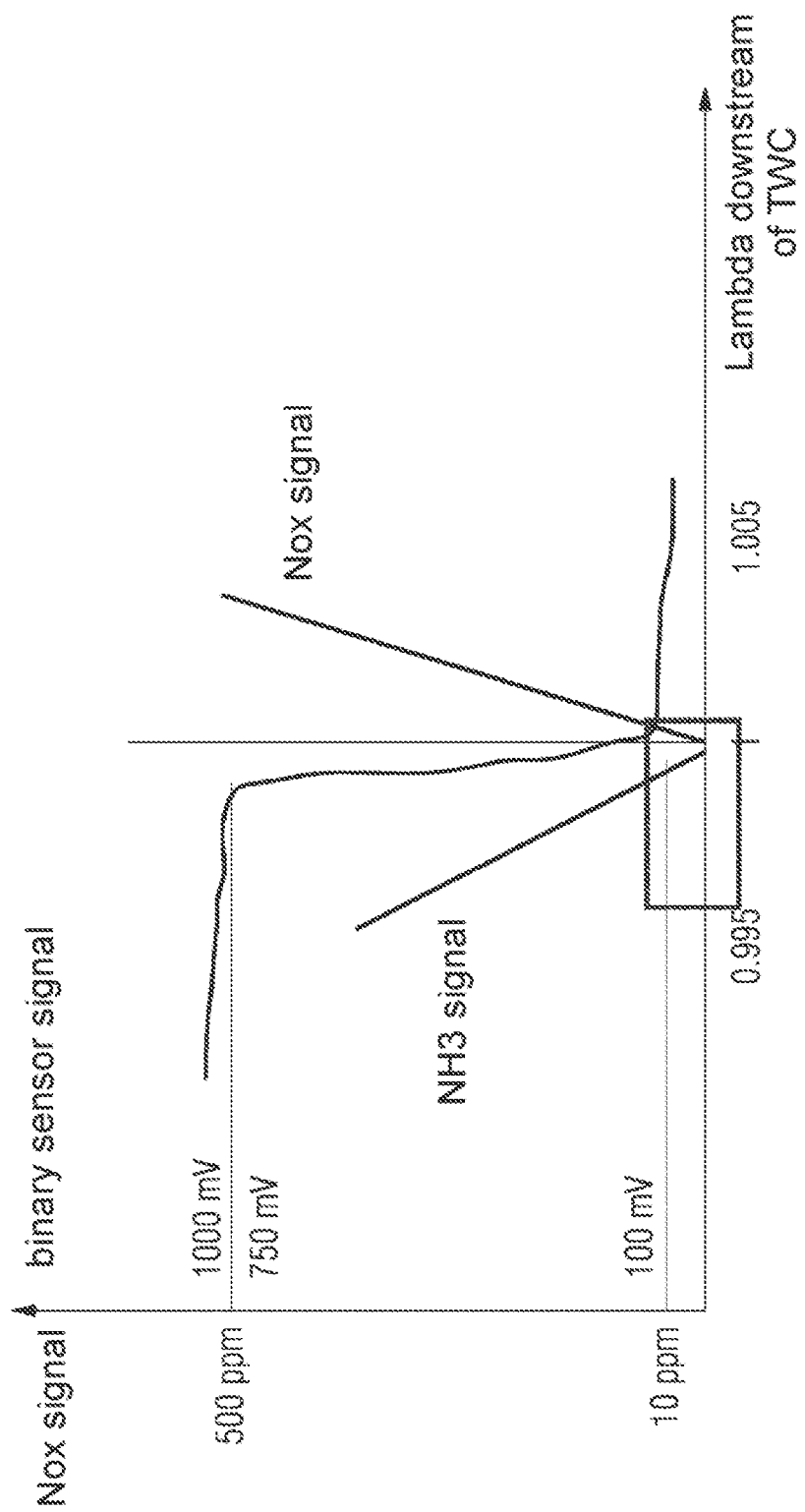

METHOD FOR OPERATING AN INTERNAL COMBUSTION ENGINE

CROSS-REFERENCE TO RELATED APPLICATIONS

This application is a U.S. National Stage Application of International Application No. PCT/EP2018/077250 filed Oct. 8, 2018, which designates the United States of America, and claims priority to DE Application No. 10 2017 218 327.6 filed Oct. 13, 2017, the contents of which are hereby incorporated by reference in their entirety.

TECHNICAL FIELD

The present disclosure relates to internal combustion engines. Various embodiments include methods for operating an internal combustion engine in the exhaust system branch of which a three-way catalytic converter with a lambda control is arranged and/or internal combustion engines.

BACKGROUND

Ever stricter requirements are being made in respect of the emissions of internal combustion engines. This also relates to the use of regulated three-way catalytic converters by means of which the oxidation of CO and $C_mH_n$ and the reduction of $NO_x$ are carried out in parallel with one another in a known way. A precondition for this is a constant stoichiometric fuel ratio (lambda=1). Such a three-way catalytic converter can therefore be used only in vehicles with a spark-ignition engine and lambda control.

In addition to a lambda probe upstream of the three-way catalytic converter for lambda control, in addition a lambda probe downstream of the three-way catalytic converter is used here to monitor the method of functioning of the catalytic converter. Correspondingly precise lambda control or catalytic converter monitoring is highly significant for minimizing both the $NO_x$ and the $CO_2$/HC emissions. As mentioned, it is known here to use a lambda probe upstream of the three-way catalytic converter and a lambda probe downstream of the three-way catalytic converter. The lambda control downstream of the catalytic converter is implemented here by specifying a setpoint value for the voltage signal (binary signal) of the lambda probe.

For example, a setpoint value of 750 mV with a bandwidth of ±20 mV is specified. Within this range, the lambda setpoint value upstream of the catalytic converter is not corrected by the binary signal of the lambda probe downstream of the catalytic converter. Outside this range, the lambda setpoint value upstream of the catalytic converter is corrected, to be precise as a function of the voltage difference between the setpoint value and the measured value downstream of the three-way catalytic converter. If the measured value is below the setpoint value, the lambda setpoint value upstream of the catalytic converter is reduced in the rich direction. If the measured value is above the setpoint value, the lambda setpoint value upstream of the catalytic converter is increased in the lean direction.

It can also be advantageous to set the setpoint value of the lambda probe (of the binary sensor), for example, above 750 mV, in order to be able to prevent an $NO_x$ breakdown in a better way. However, when there is a relatively high binary voltage, a change in voltage can bring about a relatively large lambda shift, and the accuracy of the lambda value downstream of the three-way catalytic converter can no longer be ensured by means of the binary voltage value of the probe. This can bring about a relatively high lambda drift in the rich direction, which results in higher HC and CO emissions. The known procedure is therefore subject to inaccuracies.

SUMMARY

The teachings of the present disclosure include methods of the type described at the beginning which permit the emissions of a three-way catalytic converter to be controlled particularly accurately. For example, some embodiments include a method including: arranging an $NO_x$ sensor with integrated lambda probe downstream of the three-way catalytic converter; generating with the $NO_x$ sensor an electrical signal which represents a lambda value downstream of the three-way catalytic converter; setting a threshold value of the electrical signal and determining a lambda setpoint value upstream of the three-way catalytic converter using the difference between the setpoint value of the electrical signal downstream of the three-way catalytic converter and the measured electrical signal if the measured electrical signal is below the threshold value; if the measured electrical signal is above the threshold value, determining the lambda setpoint value upstream of the three-way catalytic converter by means of the difference between a $NH_3$ setpoint value of the $NO_x$ sensor and the measured $NH_3$ signal of the $NO_x$ sensor; and if the measured $NH_3$ concentration is higher than the $NH_3$ setpoint value, increasing the lambda setpoint value upstream of the three-way catalytic converter and, if the measured $NH_3$ concentration is lower than the $NH_3$ setpoint value, reducing the lambda setpoint value upstream of the three-way catalytic converter.

As another example, some embodiments include a method for operating an internal combustion engine, in the exhaust system branch of which a three-way catalytic converter with lambda control is arranged, having the following steps: arranging an $NO_x$ sensor with integrated lambda probe downstream of the three-way catalytic converter; generating with the $NO_x$ sensor an electrical signal which represents a lambda value downstream of the three-way catalytic converter; setting a threshold value of the electrical signal and determining a lambda setpoint value upstream of the three-way catalytic converter using the difference between the setpoint value of the electrical signal downstream of the three-way catalytic converter and the measured electrical signal if the measured electrical signal is below the threshold value; if the measured electrical signal is above the threshold value, determining the lambda setpoint value upstream of the three-way catalytic converter by means of the difference between a $NH_3$ setpoint value of the $NO_x$ sensor and the measured $NH_3$ signal of the $NO_x$ sensor; and if the measured $NH_3$ concentration is higher than the $NH_3$ setpoint value, increasing the lambda setpoint value upstream of the three-way catalytic converter and, if the measured $NH_3$ concentration is lower than the $NH_3$ setpoint value, reducing the lambda setpoint value upstream of the three-way catalytic converter.

In some embodiments, the $NH_3$ setpoint value is adapted.

In some embodiments, in order to adapt the $NH_3$ setpoint value, the setpoint value of the electrical signal is slowly reduced from the actual voltage value in the direction of a low voltage value under quasi-static conditions, and the lambda setpoint value upstream of the three-way catalytic converter is adjusted by means of the difference between the setpoint value of the electrical signal and the actual signal.

In some embodiments, at the same time the $NO_x$ signal is measured by the $NO_x$ sensor and reduced continuously to a minimum owing to the reduction in the $NH_3$ concentration, and then is increased again as a result of the relatively high probability of a breakdown of the $NO_x$ concentration through the catalytic converter, wherein the minimum value of the $NO_x$ signal is used for the adaptation and also for the diagnosis of the three-way catalytic converter.

In some embodiments, the offset of the $NO_x$ sensor is adapted during a shut-off of the fuel supply or an engine stop, wherein during this phase the $NO_x$ signal is observed continuously until a stable minimum value is reached, and wherein this value is used to adapt a $NO_x$ signal characteristic diagram, since in this case the $NO_x$ output signal should be 0.

As another example, some embodiments include an internal combustion engine in the exhaust system branch of which a three-way catalytic converter with lambda control is arranged, characterized in that an $NO_x$ sensor with an integrated lambda probe is arranged downstream of the three-way catalytic converter, which sensor is designed to generate an electrical signal which represents a lambda value downstream of the three-way catalytic converter, and to generate an $NH_3$ signal which represents the $NH_3$ concentration in the exhaust gas, and is designed to pass on these signals to a control device.

In some embodiments, the $NO_x$ sensor arranged downstream of the three-way catalytic converter is designed to generate an $NO_x$ signal which represents the $NO_x$ concentration in the exhaust gas and to pass on this signal to the control device.

BRIEF DESCRIPTION OF THE DRAWING

The single FIGURE shows in a diagram the $NO_x$ signal and the binary lambda signal of an $NO_x$ sensor with an integrated lambda probe which is arranged downstream of the three-way catalytic converter in the exhaust system branch of a spark ignition engine.

DETAILED DESCRIPTION

In some embodiments, a lambda setpoint value which is important for the emission control is determined or set upstream of a three-way catalytic converter by combined measurement of a lambda value and $NH_3$ value by means of an $NO_x$ sensor with an integrated lambda probe downstream of the three-way catalytic converter. By accurately setting this lambda setpoint value upstream of the three-way catalytic converter, it is possible to keep lambda downstream of the catalytic converter in an accurately defined range, in order to minimize the $NO_x$ and $CO_2/HC$ emissions.

In some embodiments, below a threshold value of the electrical signal (binary signal) which represents the lambda value and which is set, for example, to 650 mV, the lambda setpoint value upstream of the three-way catalytic converter is determined by the difference between the setpoint value of the electrical signal for the lambda value and the measured lambda value (binary signal). However, above a threshold value of the corresponding lambda signal (binary signal), i.e. for example above 650 mV, the lambda setpoint value upstream of the catalytic converter is determined in another way, specifically using the difference between an $NH_3$ setpoint value of the $NO_x$ sensor which is set, for example, at 10 ppm, as a function of the catalytic converter temperature, and the measured $NH_3$ signal of the $NO_x$ sensor. The quantity of $NH_3$ which occurs downstream of the three-way catalytic converter is therefore used according to the invention for control purposes, since in a rich mixture state $NH_3$ is generated by the three-way catalytic converter and the $NH_3$ signal is very sensitive with respect to the lambda value downstream of the three-way catalytic converter. $NH_3$ can also be measured with the $NO_x$ sensor.

In this range, the lambda setpoint value upstream of the three-way catalytic converter is now varied as a function of the above-mentioned difference, specifically the lambda setpoint value upstream of the three-way catalytic converter is increased toward lean if the measured $NH_3$ concentration is higher than the $NH_3$ setpoint value. If, in contrast to this, the measured $NH_3$ concentration is lower than the $NH_3$ setpoint value, the lambda setpoint value upstream of the three-way catalytic converter is reduced to rich.

In some embodiments, the $NH_3$ setpoint value is adapted, since, owing to aging of the catalytic converter, the generation of $NH_3$ can decline over the service life of the three-way catalytic converter with the same lambda value, and the $NO_x$ probability of a breakdown can rise. The $NH_3$ setpoint value can be adapted here, for example, in the following way: The setpoint value of the electrical signal is slowly reduced from the actual voltage value in the direction of a low voltage value under quasi-static conditions, and the lambda setpoint value upstream of the three-way catalytic converter is adjusted by means of the difference between the setpoint value of the electrical signal and the actual signal. The speed of the reduction can be here, for example, 40 mV per second in the direction of the low voltage (for example 400 mV).

At the same time, the $NO_x$ signal can be measured by the $NO_x$ sensor and reduced continuously to a minimum owing to the reduction in the $NH_3$ concentration, and then is increased again as a result of the relatively high probability of a breakdown of the $NO_x$ concentration through the catalytic converter, wherein the minimum value of the $NO_x$ signal can be used for the adaptation and also for the diagnosis of the three-way catalytic converter. The $NH_3$ setpoint value corresponds here to the minimum value and to a difference (delta, for example 10 ppm). In a new catalytic converter the minimum value should be 0.

If the minimum value is above a threshold value, for example 70 ppm (as a function of the temperature), the catalytic converter is diagnosed as being defective.

In some embodiments, in order to increase the accuracy of the $NO_x$ sensor at a low concentration, the offset of the $NO_x$ sensor may be adapted during a shut-off of the fuel supply or an engine stop, wherein during this phase the $NO_x$ signal is observed continuously until a stable minimum value is reached, and wherein this value is used to adapt an $NO_x$ signal characteristic diagram, since in this case the $NO_x$ output signal should be 0. The $NO_x$ signal characteristic diagram corresponds here to the correlation between the current of the $NO_x$ sensor and the $NO_x$ concentration output signal.

The single FIGURE shows in a diagram the $NO_x$ signal and the binary lambda signal of an $NO_x$ sensor with an integrated lambda probe which is arranged downstream of the three-way catalytic converter in the exhaust system branch of a spark ignition engine. In this context, the lambda value downstream of the three-way catalytic converter is plotted on the abscissa. The ordinate represents the $NO_x$ signal in ppm and the binary lambda sensor signal in mV. In the rich region of the lambda signal, a threshold value of the lambda signal of 750 mV is specified. Below this threshold value, i.e. below 750 mV, the lambda setpoint value upstream of the catalytic converter is determined by the difference between the setpoint value of the binary signal and the measured binary signal. Above this threshold value of 750 mV, the lambda setpoint value upstream of the catalytic converter is determined by the difference between a $NH_3$ setpoint value, which is specified here as 10 ppm, of the $NO_x$ sensor and the measured $NH_3$ signal of the $NO_x$ sensor. If, the measured $NH_3$ concentration is higher than the $NH_3$ setpoint value, the lambda setpoint value upstream of the catalytic converter is increased to lean. If the concentration is lower than the $NH_3$ setpoint value, the lambda setpoint value is reduced to rich.

Through a combined measurement of a lambda value and of an NH value by means of an $NO_x$ sensor with an integrated lambda probe downstream of the three-way catalytic converter it is therefore possible to carry out particularly accurate setting of the lambda setpoint value upstream of the catalytic converter.

In some embodiments, an internal combustion engine in the exhaust system branch of which three-way catalytic converter with lambda control is arranged, includes an $NO_x$ sensor with an integrated lambda probe is arranged downstream of the three-way catalytic converter, which sensor is designed to generate an electrical signal which represents a lambda value downstream of the three-way catalytic converter, and to generate an $NH_3$ signal which represents the $NH_3$ concentration in the exhaust gas, and is designed to pass on these signals to a control device.

In the internal combustion engine, the $NO_x$ sensor arranged downstream of the three-way catalytic converter may be designed to generate an $NO_x$ signal which represents the $NO_x$ concentration in the exhaust gas and to pass on this signal to the control device.

What is claimed is:

1. A method for operating an internal combustion engine with an exhaust system including a three-way catalytic converter with lambda control, the method comprising:
   employing an NOx sensor with integrated lambda probe downstream of the three-way catalytic converter;
   monitoring a signal of the NOx sensor representing a lambda value downstream of the three-way catalytic converter;
   setting a threshold value of the signal and determining a lambda setpoint value upstream of the three-way catalytic converter using a difference between the setpoint value of the signal downstream of the three-way catalytic converter and the measured signal if the measured signal is below the threshold value;
   if the measured signal is above the threshold value, determining the lambda setpoint value upstream of the three-way catalytic converter based on a difference between a NH3 setpoint value of the NOx sensor and a measured NH3 signal of the NOx sensor; and
   if the measured NH3 concentration is higher than the NH3 setpoint value, increasing the lambda setpoint value upstream of the three-way catalytic converter and, if the measured NH3 concentration is lower than the NH3 setpoint value, reducing the lambda setpoint value upstream of the three-way catalytic converter.

2. The method as claimed in claim 1, further comprising adapting the NH3 setpoint value.

3. The method as claimed in claim 2, wherein adapting the NH3 setpoint value includes:
   reducing the setpoint value of the signal over time from the measured voltage value in the direction of a low voltage value under quasi-static conditions; and
   adjusting the lambda setpoint value upstream of the three-way catalytic converter based at least in part on the difference between the setpoint value of the signal and the actual signal.

4. The method as claimed in claim 3, further comprising:
   measuring the signal of the NOx sensor as it reduces continuously to a minimum owing to the reduction in the NH3 concentration; and
   measuring the NOx signal as it increases as a result of the probability of a breakdown of the NOx concentration through the catalytic converter;
   wherein the minimum of the NOx signal is used for the adaptation and also for diagnosis of the three-way catalytic converter.

5. The method as claimed in claim 1, wherein:
   an offset of the NOx sensor is adapted during a shut-off of the fuel supply or an engine stop;
   during this phase the signal of the NOx sensor is observed continuously until a stable minimum value is reached; and
   the stable minimum value is used to adapt a NOx signal characteristic diagram to match a NOx output signal of 0.

6. An internal combustion engine comprising:
   a three-way catalytic converter with lambda control in an exhaust system branch;
   an NOx sensor with an integrated lambda probe is arranged downstream of the three-way catalytic converter;
   wherein the sensor generates an electrical signal representing a lambda value downstream of the three-way catalytic converter and an NH3 signal representing an NH3 concentration in the exhaust gas; and
   a control device modifying operation of the internal combustion engine based on the signals generated by the sensor, the control device programmed to:
   employ an NOx sensor with integrated lambda probe downstream of the three-way catalytic converter;
   monitor a signal of the NOx sensor representing a lambda value downstream of the three-way catalytic converter;
   set a threshold value of the signal and determining a lambda setpoint value upstream of the three-way catalytic converter using a difference between the setpoint value of the signal downstream of the three-way catalytic converter and the measured signal if the measured signal is below the threshold value;
   if the measured signal is above the threshold value, determine the lambda setpoint value upstream of the three-way catalytic converter based on a difference between a NH3 setpoint value of the NOx sensor and a measured NH3 signal of the NOx sensor; and
   if the measured NH3 concentration is higher than the NH3 setpoint value, increase the lambda setpoint value upstream of the three-way catalytic converter and, if the measured NH3 concentration is lower than the NH3 setpoint.

7. The internal combustion engine as claimed in claim 6, wherein the NOx sensor arranged downstream of the three-way catalytic converter generates an NOx signal representing a NOx concentration in the exhaust gas.

* * * * *